United States Patent
Pines et al.

(10) Patent No.: US 12,045,237 B2
(45) Date of Patent: Jul. 23, 2024

(54) SECURE DATA REPLICATION SYSTEMS AND METHODS

(71) Applicant: Microsoft Technology Licensing, LLC, Redmond, WA (US)

(72) Inventors: Aviad Pines, Jerusalem (IL); Aviram Fireberger, Kibuts Carmia (IL); Oron Golan, Meitar Halamish (IL); Adir Atias, Migdal Ha'Emek (IL); Evgeny Lutsky, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 17/589,790

(22) Filed: Jan. 31, 2022

(65) Prior Publication Data
US 2023/0244668 A1    Aug. 3, 2023

(51) Int. Cl.
*G06F 16/00* (2019.01)
*G06F 16/2455* (2019.01)
*G06F 16/248* (2019.01)
*G06F 21/62* (2013.01)

(52) U.S. Cl.
CPC ........ *G06F 16/2455* (2019.01); *G06F 16/248* (2019.01); *G06F 21/6218* (2013.01)

(58) Field of Classification Search
CPC . G06F 16/2455; G06F 16/248; G06F 21/6218
See application file for complete search history.

(56) References Cited

U.S. PATENT DOCUMENTS

| | | | |
|---|---|---|---|
| 8,719,143 B2 | 5/2014 | Meijer et al. | |
| 2010/0122303 A1 | 5/2010 | Maloney | |
| 2012/0271946 A1 | 10/2012 | Choti et al. | |

(Continued)

OTHER PUBLICATIONS

"Accelerate Innovation with the Commercial Marketplace", Retrieved From: https://web.archive.org/web/20210826102858/https:/azure.microsoft.com/en-us/marketplace/, Aug. 26, 2021, 6 Pages.

(Continued)

*Primary Examiner* — Thu Nguyet T Le
(74) *Attorney, Agent, or Firm* — Schwegman Lundberg & Woessner, P.A.

(57) ABSTRACT

One method embodiment includes receiving input creating a data distribution restriction implemented to restrict distribution of data by publisher nodes located in at least one geographic or political area to subscriber nodes outside of the at least one geographic or political area. The method then queries a subscription repository storing data defining subscriptions to publisher node data events on publisher nodes located in the at least one geographic or political area to identify existing subscriptions to data events about the particular data by subscriber nodes located outside of the at least one geographic or political area. The method may then output the query results identifying existing subscriber node subscriptions contrary to the new or newly modified data distribution restriction. The received input may then be stored in a database such that subsequent changes are conditionally limited by the new or newly modified data distribution restriction.

17 Claims, 6 Drawing Sheets

(56) References Cited

U.S. PATENT DOCUMENTS

2016/0072843 A1* 3/2016 Cam-Winget .......... G06F 9/542 726/1

OTHER PUBLICATIONS

"Azure Information Protection", Retrieved From: https://web.archive.org/web/20210826103222/https://azure.microsoft.com/en-us/services/information-protection/, Aug. 26, 2021, 7 Pages.

"Azure Policy", Retrieved From: https://web.archive.org/web/20171002153450/https://azure.microsoft.com/en-us/services/azure-policy/, Oct. 2, 2017, 12 Pages.

Skorlinski, Chris, "Customizing Distribution Agent Stored Procedures", Retrieved From: https://repltalk.com/2020/05/20/customizing-distribution-agent-stored-procedures/, May 20, 2020, 8 Pages.

"Detection of IP addresses, geolocations, and user agents", Retrieved From: https://web.archive.org/web/20211129030135/https://www.dynatrace.com/support/help/how-to-use-dynatrace/real-user-monitoring/basic-concepts/detection-of-ip-addresses-locations-and-user-agents/, Nov. 29, 2021, 4 Pages.

"Devtools for data privacy", Retrieved From: https://web.archive.org/web/20220103173659/https://ethyca.com/, Jan. 3, 2022, 15 Pages.

"IBM InfoSphere Data Replication (CDC Replication) and related PIDs, InfoSphere Classic CDC for z/OS, considerations for GDPR readiness", Retrieved From: https://www.ibm.com/docs/en/idr/11.4.0?topic=requirements-cdc-considerations-gdpr-readiness, Retrieved on: May 9, 2021, 11 Pages.

"IBM InfoSphere Data Replication (Q and SQL Replication) and related PIDs, considerations for GDPR readiness", Retrieved From: https://www.ibm.com/docs/en/idr/11.4.0?topic=overviews-considerations-gdpr-readiness, Retrieved on: May 9, 2021, 10 Pages.

"Less interruptions, More compliance", Retrieved From: https://web.archive.org/web/20211230233927/https://complyon.com/, Dec. 30, 2021, 6 Pages.

"Microsoft Defender for Cloud", Retrieved From: https://web.archive.org/web/20211218160655/https://azure.microsoft.com/en-us/services/defender-for-cloud/, Dec. 18, 2021, 10 Pages.

"MOVEit®—Managed File Transfer Software", Retrieved From: https://web.archive.org/web/20211217103931/https://www.ipswitch.com/moveit, Dec. 17, 2021, 7 Pages.

Wallace, et al., "Azure Policy Samples", Retrieved From: https://docs.microsoft.com/en-us/azure/governance/policy/samples/#regulatory-compliance, Sep. 14, 2021, 3 Pages.

"MOVEit® Cloud—Cloud Managed File Transfer as-a-Service", Retrieved From: https://www.ipswitch.com/moveit-cloud, May 9, 2021, 7 Pages.

"PeerGFS", Retrieved From: https://www.peersoftware.com/products/peergfs/?utm_term=data%20replication&utm_campaign=NonBrand_PeerGFS_USA&utm_source=bing&utm_medium=ppc&hsa_acc=8331533700&hsa_cam=10951864736&hsa_grp=1308419124873804&hsa_ad=&hsa_src=o&hsa_tgt=kwd, Retrieved on: May 9, 2021, 8 Pages.

"Redefining Data Loss Prevention (DLP)", Retrieved From: https://www.proofpoint.com/us/resources/e-books/redefining-data-loss-prevention-dlp?utm_source=bing&utm_medium=cpc&gclid=43310f5b30c11728f4436e7bb5107558&gclsrc=3p.ds&msclkid=43310f5b30c11728f4436e7bb5107558, Retrieved on: May 9, 2021, 3 Pages.

"Securiti", Retrieved From: https://web.archive.org/web/20220111102456/https://securiti.ai/, Retrieved on: Jan. 11, 2022, 6 Pages.

"SOVY", Retrieved From: https://web.archive.org/web/20211222171304/https://www.sovy.com/, Retrieved on: Dec. 22, 2021, 7 Pages.

"Application as Filed in U.S. Appl. No. 17/567,022", filed Dec. 31, 2021, 69 Pages.

Bose, Michael, "How to Configure MS SQL Server Replication: Complete Walkthrough", Retrieved From: https://www.nakivo.com/blog/how-to-configure-ms-sql-server-replication-walkthrough/, Mar. 18, 2020, 42 Pages.

Cherukuri, Ranga, "Migrating to Amazon RDS for SQL Server using transactional replication: Part 2", Retrieved From: https://muawia.com/migrating-to-amazon-rds-for-sql-server-using-transactional-replication-part-2/, Nov. 5, 2020, 10 Pages.

"Replication of user data a violation of GDPR", Retrieved From: https://web.archive.org/web/20201022145227/https://law.stackexchange.com/questions/36654/replication-of-user-data-a-violation-of-gdpr, Oct. 22, 2020, 2 Pages.

Griffee, et al., "Microsoft Compliance Manager (Classic)", Retrieved from: https://docs.microsoft.com/en-us/microsoft-365/compliance/meet-data-protection-and-regulatory-reqs-using-microsoft-cloud?view=o365-worldwide, Oct. 6, 2021, 51 Pages.

Masha, et al., "Configure Distribution", Retrieved From: https://docs.microsoft.com/en-us/sql/relational-databases/replication/configure-distribution?view=sql-server-ver15, Dec. 15, 2020, 3 Pages.

Masha, et al., "Configure Publishing and Distribution", Retrieved From: https://docs.microsoft.com/en-us/sql/relational-databases/replication/configure-publishing-and-distribution?view=sql-server-ver15, Jan. 30, 2021, 10 Pages.

Masha, et al., "Filter Published Data", Retrieved From: https://docs.microsoft.com/en-us/sql/relational-databases/replication/publish/filter-published-data?view=sql-server-ver15, Dec. 15, 2020, 6 Pages.

Masha, et al., "Parameterized Filters—Parameterized Row Filters", Retrieved From: https://docs.microsoft.com/en-us/sql/relational-databases/replication/merge/parameterized-filters-parameterized-row-filters?view=sql-server-ver15, Aug. 17, 2020, 10 Pages.

Masha, et al., "Replication Agent Profiles", Retrieved From: https://docs.microsoft.com/en-us/sql/relational-databases/replication/agents/replication-agent-profiles?view=sql-server-ver15, Dec. 15, 2020, 6 Pages.

Masha, et al., "Replication Agent Security Model", Retrieved From: https://docs.microsoft.com/en-us/sql/relational-databases/replication/security/replication-agent-security-model?view=sql-server-ver15, Aug. 6, 2020, 7 Pages.

Masha, et al., "Security Role Requirements for Replication", Retrieved From: https://docs.microsoft.com/en-us/sql/relational-databases/replication/security/security-role-requirements-for-replication?view=sql-server-ver15, Dec. 15, 2020, 4 Pages.

Masha, et al., "sp_adddistributor (Transact-SQL)", Retrieved From: https://docs.microsoft.com/en-us/sql/relational-databases/system-stored-procedures/sp-adddistributor-transact-sql?view=sql-server-ver15, Mar. 30, 2021, 4 Pages.

Masha, et al., "sp_addpushsubscription_agent (Transact-SQL)", Retrieved From: https://docs.microsoft.com/en-us/sql/relational-databases/system-stored-procedures/sp-addpushsubscription-agent-transact-sql?view=sql-server-ver15, Jan. 6, 2022, 9 Pages.

Masha, et al., "View and Modify Replication Security Settings", Retrieved From: https://docs.microsoft.com/en-us/sql/relational-databases/replication/security/view-and-modify-replication-security-settings?view=sql-server-ver15, Apr. 30, 2021, 27 Pages.

Policht, Marcin, "Azure SQL Database—Row-Level Security", Retrieved From: https://www.databasejournal.com/features/mssql/azure-sql-database-row-level-security.html, Oct. 5, 2015, 3 Pages.

Policht, Marcin, "Azure SQL Database and GDPR Compliance", Retrieved From: https://www.databasejournal.com/features/mssql/azure-sql-database-and-gdpr-compliance.html, Jun. 7, 2018, 6 Pages.

Hasenburg, et al., "GeoBroker: Leveraging Geo-Contexts for IoT Data Distribution", In Journal of Computer Communications, vol. 151, Feb. 1, 2020, pp. 473-484.

"International Search Report and Written Opinion Issued in PCT Application No. PCT/US23/010256", Mailed Date: May 9, 2023, 13 Pages.

Singh, et al., "Credential Management in Event-Driven Healthcare Systems", In Proceedings of the ACM/IFIP/USENIX Middleware Conference Companion, Dec. 1, 2008, pp. 48-53.

* cited by examiner

SECURE DATA REPLICATION SYSTEMS AND METHODS

FIELD

The present application is generally related to data storage and distribution and more particularly to secure data replication systems and methods.

BACKGROUND INFORMATION

In recent years, data protection has become increasingly important. This importance has increased due to several factors including easy, rapid, and even automatic data replication, personal data privacy concerns, data security breaches and resulting negative consumer sentiment, export regulation, and data privacy regulation, amongst others. Resulting compliance with regulations (e.g., General Data Protection Regulation or "GDPR", California Consumer Protection Act or "CCPA", Health Insurance Portability and Accountability Act or "HIPAA"), corporate policies, contractual requirements, and consumer expectations is thereby a very specialized, time-consuming, and error-prone process. Such errors can result in significant fines, detrimental news reports, and loss of customer trust.

SUMMARY

Various embodiments herein address issues arising from data sharing, privacy, and security regulations, laws, and other such restrictions in some embodiments by introducing a role or function of Policy Inspector. The Policy Inspector is responsible for storing, managing, evaluating, and acting upon pre-defined policies when new data replication events, such as when setting up a new subscription for a subscriber data storage node to data events published by a publisher data storage node. The roles or functions in data replication in various embodiments herein are therefore Publisher, Subscriber, Distributor, and Policy Inspector. Such embodiments can not only increase data security and compliance with policies and legal requirements, but also increase system performance by eliminating previously required validation of every data replication event.

One embodiment in the form of a method includes receiving input creating or modifying a data distribution restriction, which when implemented will restrict distribution of particular data by publisher nodes located in at least one geographic or political area to subscriber nodes outside of the at least one geographic or political area. The method continues by querying a subscription repository storing data defining subscriptions to publisher node data events on publisher nodes located in the at least one geographic or political area to identify existing subscriptions to data events about the particular data by subscriber nodes located outside of the at least one geographic or political area. The method may then output the query results identifying existing subscriber node subscriptions contrary to the new or newly modified data distribution restriction. The received input may then be stored in a database such that subsequent changes to existing and creation of new subscriptions are conditionally limited by the new or newly modified data distribution restriction.

Another method embodiment includes storing data on a data storage device identifying a data source and designating that data source as a publisher node to which other nodes maybe subscribe, and a location associated with the source. This method may then store additional data on the data storage device identifying a subscriber node and a location associated with the subscriber node. Input my then be received requesting a subscription from the publisher node by a subscriber node. In response thereto, some embodiments continue by retrieving, from a database, location data identifying the locations of the publisher and subscriber nodes and further retrieving, from the database, any location-related policies associated with the location of one or both of the publisher and subscriber nodes, each location related policy restricting distribution of data from, to, or between locations specified in data defining the respective location related policy. Validating processing is then performed on the requested subscription in view of all retrieved location-related policies. Upon success of the validating, this method includes storing, in the database, data enabling the requested subscription and transmitting a success indication via the network in response to the received subscription request.

A further example embodiment is in the form of a data management system including a computer processor, a network interface device, a data storage device, and instructions stored on the data storage device defining modules of the data management system. The instructions of such embodiments are executable by the computer processor on data local to the data management system and as accessible via the network interface device. These modules include various modules. In some such embodiments, a policy repository module stores data defining at least one policy restricting replication of data by a distributor service module from publisher nodes with a first association to subscriber nodes with a second association. The distributor service module, in some embodiments replicates data from publisher nodes to respective subscriber nodes upon occurrence of data events configured to invoke data replication from publisher nodes to subscriber nodes subject to compliance with policies defined in data stored in the policy repository module. Additionally, policy engine module executes to apply the policies defined in data stored in the policy repository module to restrict distribution of data by the distributor service module.

DETAILED DESCRIPTION

Modern data systems often rely on distributed data models where data is replicated from one database to another over vast distances. This replication may occur for different reasons and to address different concerns. For example, current replication models and tools have two significant concerns: Data integrity, i.e., ensuring that all the data is correctly replicated from its source to its desired destination, and performance improvements, i.e., filter replicated data to decrease latency and overall network throughput. However, such tools do not consider policies or additional issues that a company will examine before replicating the data. Further, enforcing data sharing and replication policies and legal requirements upon every data replication event as is currently the norm is counter productive to the performance improvement goals of some such efforts.

Blindly replicating data from one location to another may result in breaching policies and regulations, such as the European Union ("EU") Standard Contractual Clauses ("SCC"), General Data Protection and Privacy Regulations ("GDPR"), California Consumer Protection Act ("CCPA"), and Health Insurance Portability and Accountability Act ("HIPPA"). Other policies and regulations may be for purposes of implementing compliance with export controls, national or company security concerns or purposes, protection of trade secret data, compliance with contractual obligation, and other similar purposes. Such breaches may occur by copying data to a data storage system in a location that one of these or other policies and regulations forbids.

In most instances, such a breach does not have to be a malicious act. The breach may be done by mistake, for example, if a database administrator is not aware of a regulation or a policy and copies the data to a forbidden location or sets up a data replication process to automatically publish data events to offending locales. For a global company, breaches can be quite easy. Regardless, violation can bring significant fines, detrimental news reports, and loss of customer trust.

Various embodiments herein address such issues by introducing a role or function of Policy Inspector that is responsible for storing, managing, evaluating, and acting upon pre-defined policies when new data replication events, such as when setting up a new subscription for a subscriber data storage node to data events published by a publisher data storage node. Such embodiments validate data replication when a subscription is being set up before any offending data replication can occur. Thus, only established subscriptions can be created thereby eliminating data processing resource consumption for validation upon occurrence of every data replication triggering event.

The roles or functions in data replication in various embodiments herein are therefore Publisher, Subscriber, Distributor, and Policy Inspector. A Publisher is a data storage node configured to publish data from configured data events to the Distributor. A Subscriber is a data storage node configured to receive data from certain configured data events by Publishers available from the Distributor. The Distributor is a mediator that registers Subscribers to receive data events, such as new data and updates to existing data, from Publishers.

The Policy Inspector role or function, in some embodiments, may be a subordinate element of the Distributor or a distinct element and perform several tasks. These tasks may include storing policy data that includes representations of how various policies, laws, and regulations affect or restrict data sharing and replication, evaluating subscriptions as they are created and when new policies are defined to at least identify impact to existing subscriptions and even act to notify and correct some or all violations, among other tasks. Such tasks, in some embodiments, utilize stored data that identifies various properties of publisher and subscriber data storage nodes such as geographic markers (geo markers) that identify one or both of geographic (e.g., physical location) and political areas (e.g., country, economic region or authority, trade or other treaty participation) where the respective node is located. In some such embodiments, the various publisher and subscriber nodes do not need knowledge of the geo markers of the others as the Policy Inspector will have data in this regard. In some other embodiments, policies maybe established for other purposes such as restricting data sharing that would expose data to certain individuals, people with certain roles such as contractors or people of citizenship or other demographic information subject to export control data restriction where simply storing data to a location where an unauthorized person might be able to access sensitive data creates a violation regardless of whether the data was actually accessed, and the like.

These and other embodiments are described herein with reference to the figures. Such embodiments enable greater, quicker, and more accurate and predictable compliance and may be implemented with minimal effort for both database administrators and policy officers.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
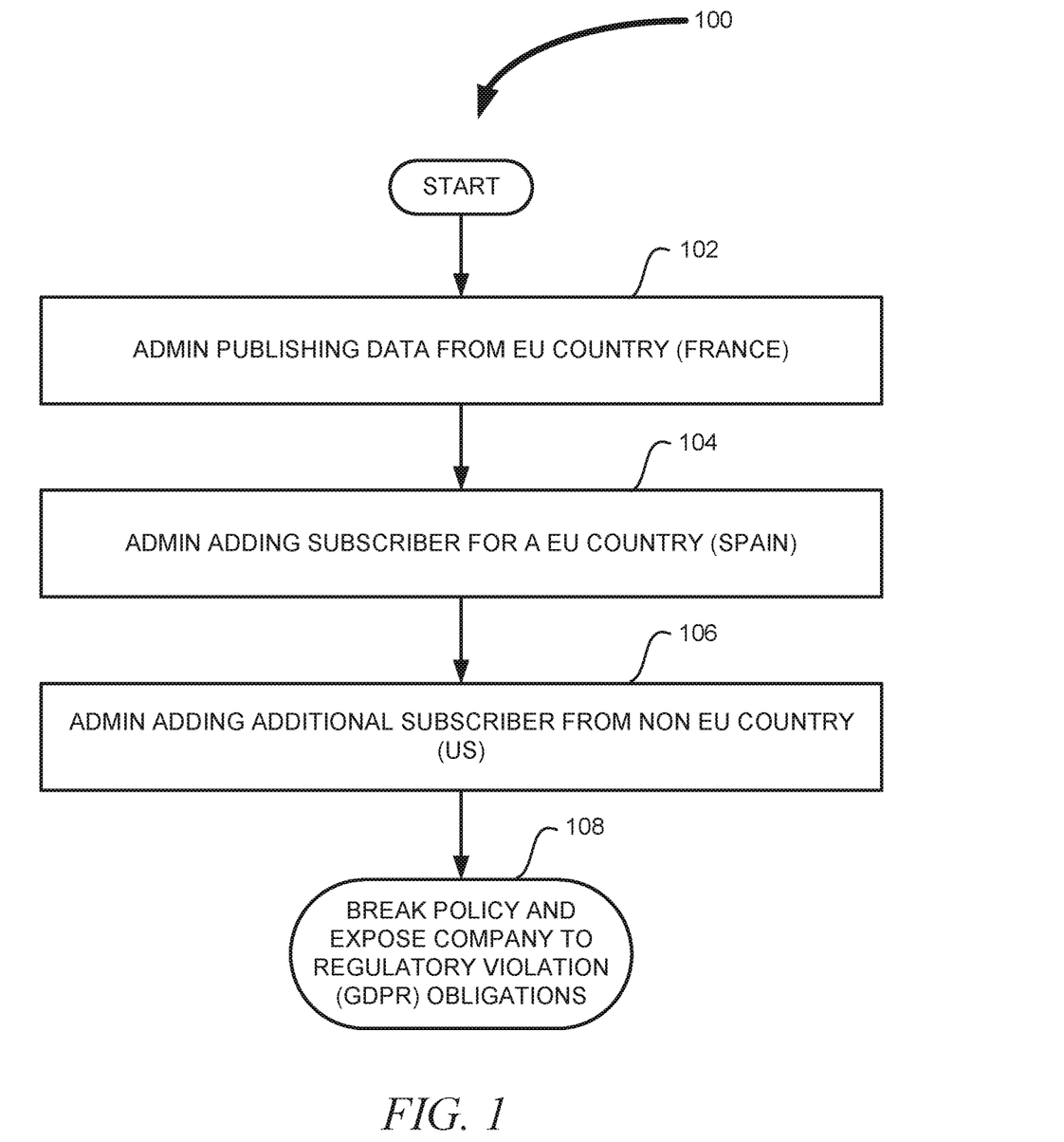
FIG. 1 is a block flow diagram of a method according to an example embodiment.

FIG. 1 is a block flow diagram of a method 100 according to an example embodiment. The method 100 is an example of a method that is executed by a policy inspector module to validate newly added subscriptions at the time of definition by an administrator but before they are stored.

The method 100 maybe performed based on input from a database administrator, a policy officer, or other individual so tasked. In some embodiments, the method 100 is performed based on input received within a user interface presented by one or more of a webpage, a mobile device application, a client deployed application, via a command line interface, and the like. Regardless, the various validation functions of the method 100 may be performed on a computing device where the input is received, on a remote server, or in the cloud based on policy data that may be stored on the computing device where the validation is performed, on a remote server, or in the cloud.

The method 100 includes receiving 102 input designating a data storage node as a publisher and designating a geo marker of where the data storage node is located, such as France. France, being an EU member state, may also automatically create an EU designation in some embodiments.

Next the method 100 includes receiving 104 input configuring a subscriber data storage node to receive data replicated from publisher of the received 102 input. The subscriber may already be designated with a geo marker or the received 104 input may also include a geo marker, such as Spain which is also a EU member state. The method 100 also similarly includes receiving 106 input configuring a subscriber data storage node to receive data replicated from the publisher of the received 102 input. The received 106 input is with regard to a subscriber located in the United States, a non-EU member state.

The next input received may be a command to store the received 102, 104, 106 inputs, although in other embodiments, a store command may be received with regard to each of the received 102, 104, 106 inputs or may be performed automatically as input is received. Regardless, of when a store command input is received, whether manual or automatic, prior to storing each data replication configuration, the method 100 includes retrieving relevant policies from a policy repository to determine whether any policies, regulations, and the like are violated. The policy retrieval may relay on the geo markers associated with each of the publisher and subscribers. In the illustrated embodiments, the publisher is in France and the first subscriber is in Spain. Both are EU member states, so there may be no GDPR violation and the received 102 publisher and received 104 subscription inputs are stored. However, the second received 106 subscriber input is with regard to a subscriber located in the United States, not a EU member state. As such, the second received input would break 108 the GDPR regulation, for example, and the received 106 input is not stored as a subscription. In some embodiments, at each point of the method 100 where input is stored nor not stored, an entry may be made in an audit table or audit file to track additions, identified violations, deletions, and the like such that an audit trail may be recreated for accountability purposes and to assist in troubleshooting any issues that may arise.

Figure 2:
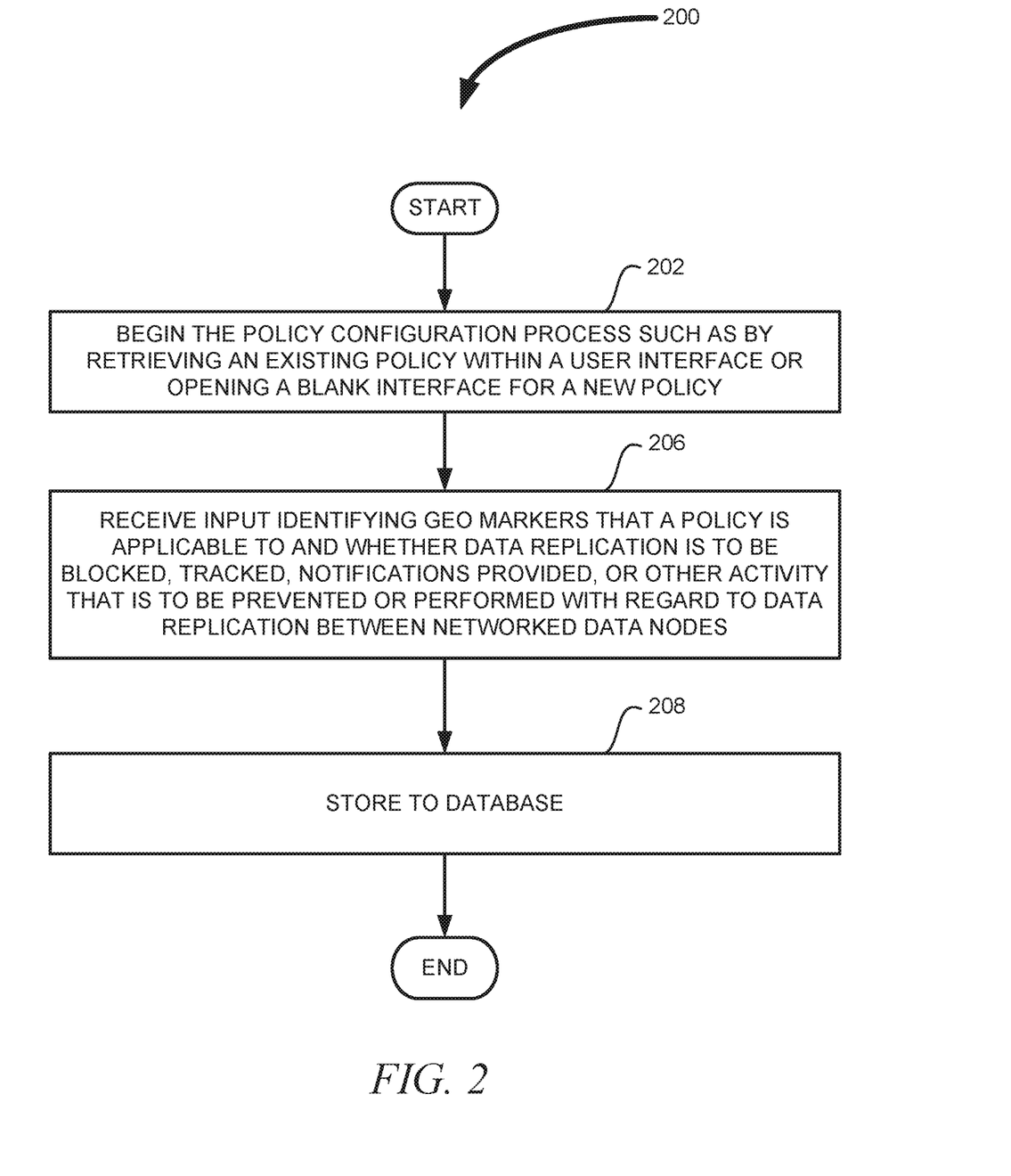
FIG. 2 is a block flow diagram of a method according to an example embodiment.

FIG. 2 is a block flow diagram of a method 200 according to an example embodiment. The method 200 is an example of method that may be performed to receive input to define a policy based on a data privacy policy or regulation a company sets or is subject to based on law, regulation, contractually, or otherwise.

The method 200 maybe performed based on input from a database administrator, a policy officer, or other individual so tasked to create data representations of policies stored in the policy repository. In some embodiments, the method 200 is performed based on input received within a user interface presented by one or more of a webpage, a mobile device application, a client deployed application, via a command line interface, and the like. Regardless, the various elements of the method 200 may be performed on a computing device where the input is received, on a remote server, or in the cloud based on policy data that may be stored on the computing device where the validation is performed, on a remote server, or in the cloud.

The method 200 includes beginning 202 the policy configuration process such as by retrieving an existing policy within a user interface or opening a blank interface for a new policy. The method 200 continues by receiving 204 input identifying geo markers, such as countries, treaty regions or members, political or geographic areas, and the like that a policy is applicable to and whether data replication is to be blocked, tracked, notifications provided, or other activity that is to be prevented or performed with regard to data replication between networked data nodes, such as relational databases. The received input may also include additional data associating the policy, directly in data or with a description, with a particular law, regulation, company policy, contractual obligation, best practices standard, user or customer preference, and the like. The method 206 may then store 206 the policy to the policy repository 208.

In some embodiments of the method 200, receiving 204 input identifying geo markers may instead include receiving input creating or modifying a data distribution restriction, which when implemented will restrict distribution of particular data by publisher nodes having at least one associated property to subscriber nodes not having the at least one associated property. That property, rather than a geo marker may be data identifying an item of data with regard to one or more individuals, for example a country of citizenship, an individual identity, a role or roles of one or a group of people, and other data that can be used to segment individuals or entities. In such embodiments, the method 200 is then adapted to restrict data replication from data stores where individuals or entities either inclusively or exclusively of the identified group based on the item of data.

Figure 3:
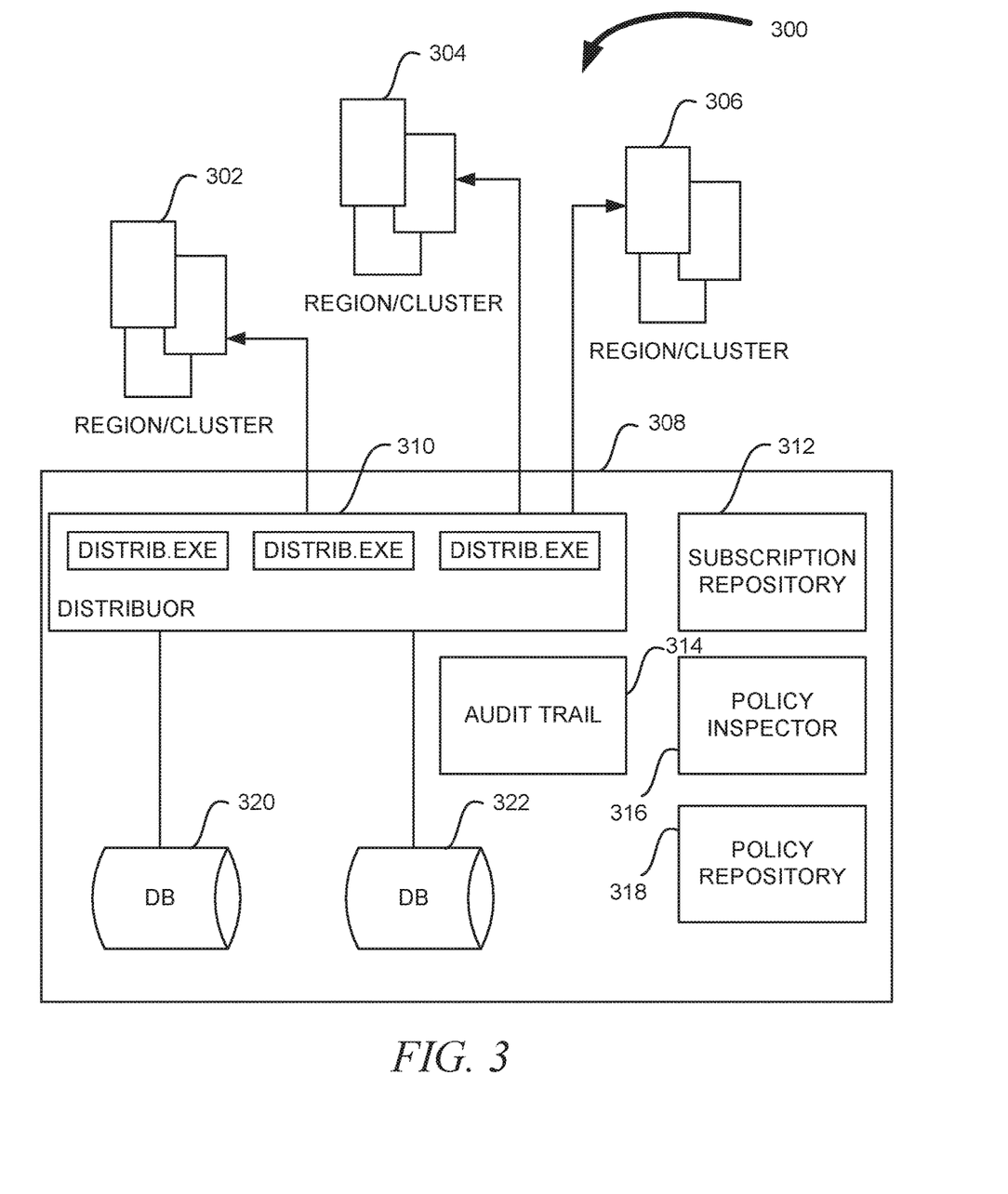
FIG. 3 is a block flow diagram of a method according to an example embodiment.

FIG. 3 is a logical block diagram of a system 300 according to an example embodiment. The system 300 is an example of a system on which some embodiments may be deployed. The system includes clusters of data management systems 302, 304, 306, 308 deployed to different regions, such as countries, states, economic zones, and the like. The clusters of data management system 302, 304, 306, 308 maybe or include one or more of database management systems such as a relational database management system, file replication system, and the like.

As illustrated, the data management system cluster 308 includes two databases 320, 322 that setup as publishers to the distributor 310. The distributor operates to service data subscriptions as set up in the subscription repository 312 to replicate data from the databases 320, 322 to databases of databases setup as subscribers within the other clusters of data management system 302, 304, 306 or even from one database 320, 322 to the other database 320, 322. The subscriptions are subject to policies as described elsewhere herein and stored in the policy repository 318. The policies stored in the policy repository are applied by the policy inspector 316 to ensure subscriptions in the subscription repository 312 are not in violation of policies stored in the policy repository 318. As subscriptions are created and stored in the subscription repository, some embodiments include the policy inspector 316 executing to first ensure the subscriptions are policy compliant prior to storing them. However, some embodiments may instead evaluate subscriptions prior to fulfillment of a data replication event by a distributor 310. The data management system cluster 308 also includes an audit trail 314 where various data is logged with regard to policy and subscription creation, editing, and application.

Figure 4:
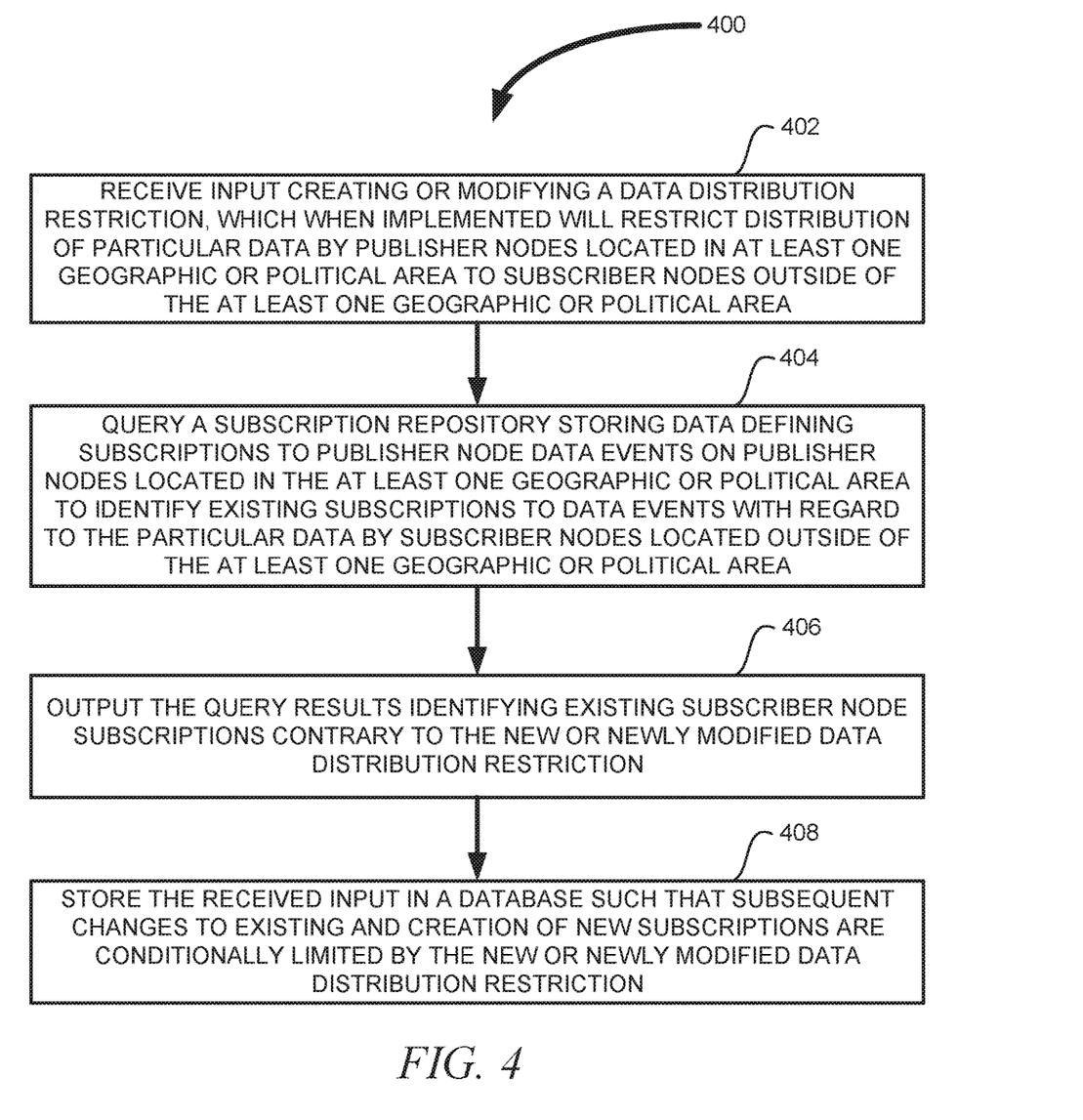
FIG. 4 is a logical block diagram of a system according to an example embodiment.

FIG. 4 is a block flow diagram of a method 400 according to an example embodiment. The method 400 is an example of a method that maybe be performed to create a new or modify an existing policy.

For example, the method 400 includes receiving 402 input creating or modifying a data distribution restriction. The data distribution restriction, which when implemented, will restrict distribution of particular data by publisher nodes of data storage systems, such as relational database management systems, located in at least one geographic or political area to subscriber nodes outside of the at least one geographic or political area.

In some embodiments of the method 400, and some other embodiments herein, a policy or data distribution restriction may be with regard to all data from a subject database. However, in some instances, the restriction may be with regard to certain types of data only, such as financial account data, medical data, identity data, or other data less than an entirety of a database. These restrictions may be specified by specific columns or tables of a database. In other embodiments, one or more databases may include metadata that provides characteristic details about data stored therein by column, table, database views, stored procedures, and the like. As such, restrictions in some embodiments maybe defined with reference to such metadata of some databases to enable further logic to be defined within policies to determine what data to restrict based on a particular policy.

The method 400 further includes querying 404 a subscription repository storing data defining subscriptions to publisher node data events on publisher nodes located in the at least one geographic or political area. The querying 404 is performed to identify existing subscriptions to data events with regard to the particular data by subscriber nodes located outside of the at least one geographic or political area. The method may then output 406 the query results identifying existing subscriber node subscriptions contrary to the new or newly modified data distribution restriction and store 408 the received input in a database. As a result, subsequent changes to existing and creation of new subscriptions are conditionally limited by the new or newly modified data distribution restriction.

Some embodiments of the method 400 further include suspending the identified existing subscriber node subscriptions identified by the querying 404 that are contrary to the new or newly modified data distribution restriction. In some such embodiments, a listing of the identified subscriptions may be presented in a user interface, one or more messages may be sent to inform a subscriber of the suspended subscription, or other notification generation and presented or sent. In other embodiments, a listing of the identified existing subscriber node subscriptions identified by the querying 404 may be output to a user or via another communication mechanism, such as email, to inform appropriate parties or entities of the issue.

Figure 5:
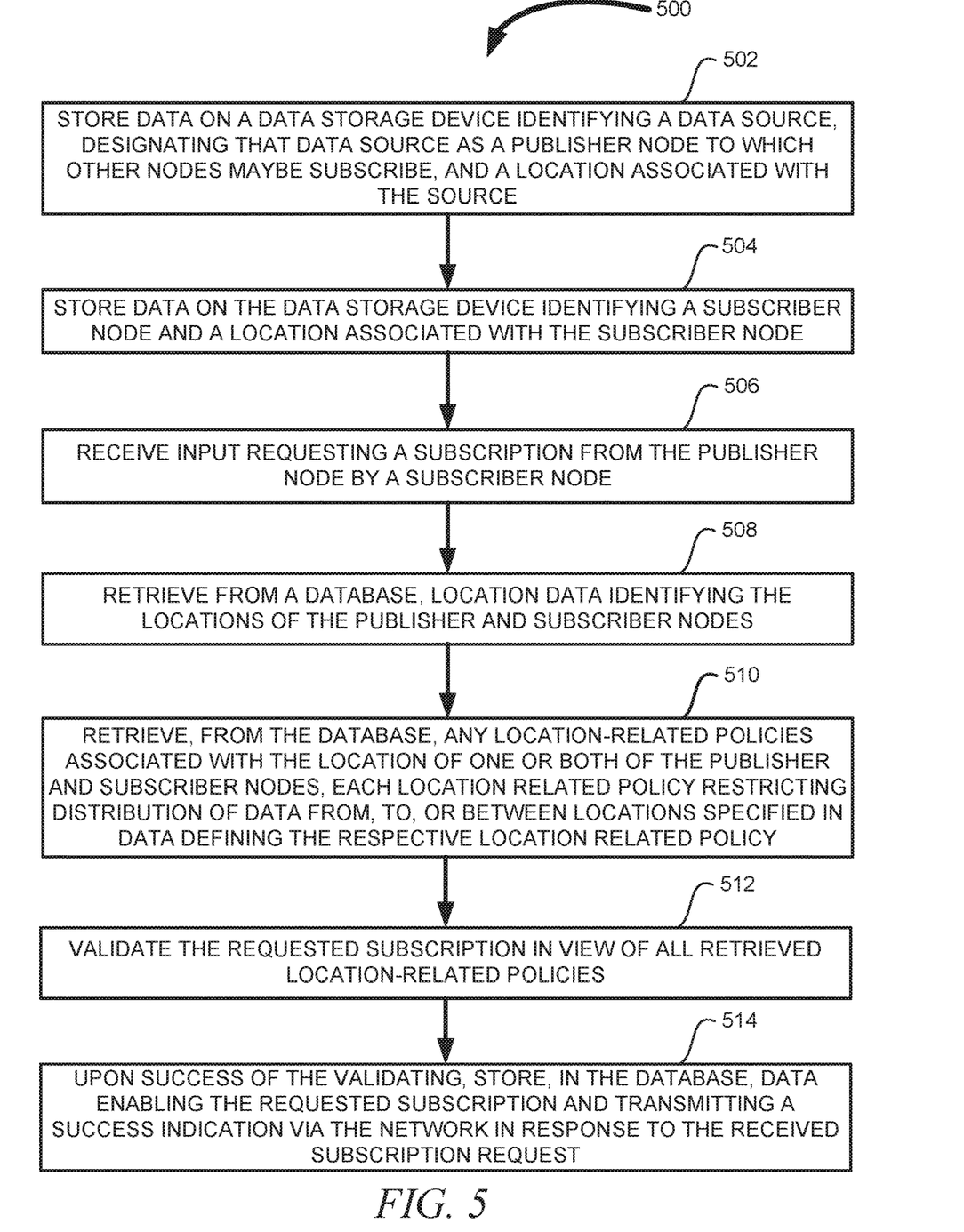
FIG. 5 is a block flow diagram of a method according to an example embodiment.

FIG. 5 is a block flow diagram of a method 500 according to an example embodiment. The method 500 is an example of a method that may be performed to define a subscription and validating the subscription in view of one data replication restrictions embodied in stored policy data.

The method 500 includes storing 502 data on a data storage device identifying a data source and designating that data source as a publisher node to which other nodes maybe subscribe. The stored data also including data identifying a location associated with the data source. The method 500 further includes storing 504 data on the data storage device identifying a subscriber node and a location associated with the subscriber node.

The method 500, in some embodiments, includes receiving 506 input requesting a subscription from the publisher node by a subscriber node and retrieving 508, from a database, location data identifying the locations of the publisher and subscriber nodes. The method 500 also includes retrieving 510, from the database, any location-related policies associated with the location of one or both of the publisher and subscriber nodes. In such embodiments, each location related policy that is retrieved 510 restricts distribution of data from, to, or between locations specified in data defining the respective location related policy. The retrieve 510 location related policies are then utilized to validate 512 the requested subscription. upon successfully validating 512 the requested subscription the method 500 includes storing 514, in the database, data enabling the requested subscription and transmitting a success indication via the network in response to the received subscription request.

In another embodiment of the method 500, upon failure of the validating 512, an error indication is transmitted via the network in response to the received subscription request and the subscription request is then disregarded. A further embodiment of the method 500 includes receiving, via the network and storing on the data storage device, input identifying the data source as storing a type of data subject to at least one of a privacy and security requirement limiting access to and distribution of data stored by the data source.

Figure 6:
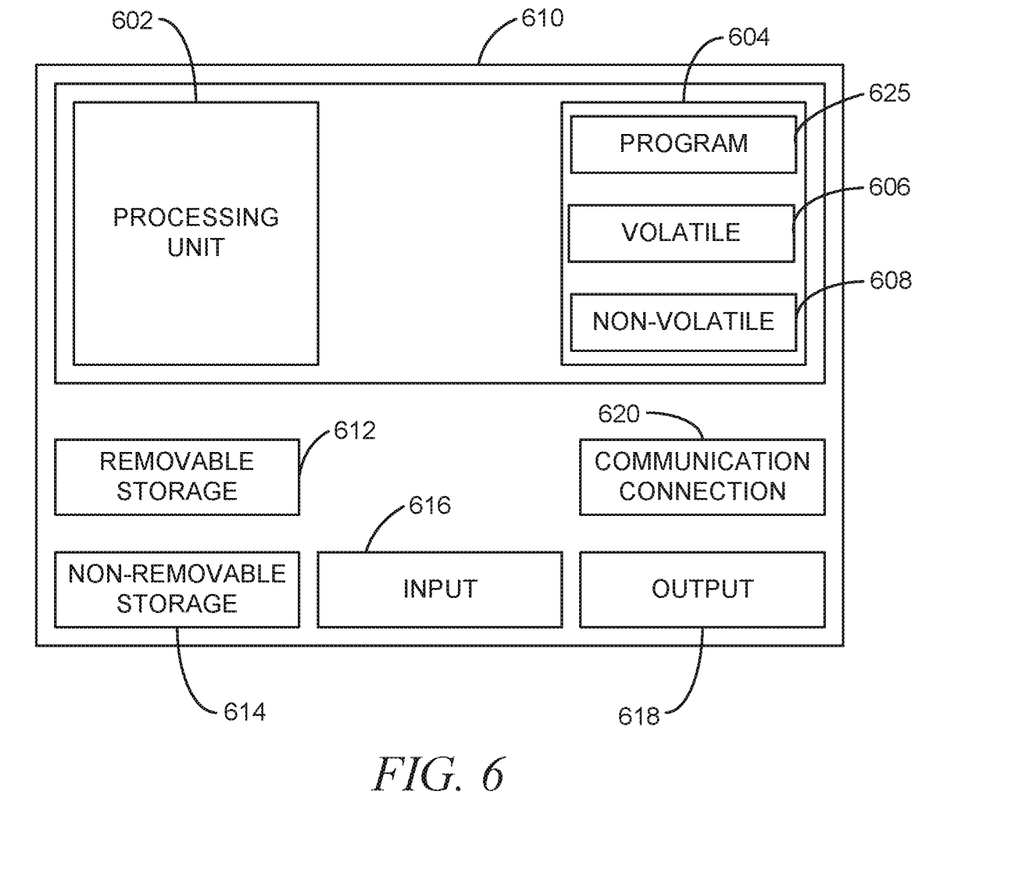
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction-based environment. An object-oriented, service-oriented, cloud-based, other architecture, or various combinations thereof may be used to implement such functions and communicate between the multiple systems and components.

One example computing device in the form of a computer 610, may include a processing unit 602, memory 604, removable storage 612, and non-removable storage 614. Although the example computing device is illustrated and described as computer 610, the computing device may include or communicate with different forms of computing devices in different embodiments. For example, the computing device may instead be a computing device on which multiple virtual machines execute, a smartphone, a tablet, smartwatch, or other computing device including the same or similar elements as illustrated and described regarding FIG. 6. Devices such as smartphones, tablets, and smartwatches are generally collectively referred to as mobile devices. Further, although the various data storage elements are illustrated as part of the computer 610, the storage may also or alternatively include cloud-based storage accessible via a network, such as the Internet.

Returning to the computer 610, memory 604 may include volatile memory 606 and non-volatile memory 608. Computer 610 may include—or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 610 may include or have access to a computing environment that includes input 616, output 618, and a communication connection 620. The input 616 may include one or more of a touchscreen, touchpad, mouse, keyboard, camera, one or more device-specific buttons, one or more sensors integrated within or coupled via wired or wireless data connections to the computer 610, and other input devices. The computer 610 may operate in a networked environment using a communication connection 620 to connect to one or more remote computers, such as database servers, web servers, and other computing device. An example remote computer may include a personal computer (PC), server, router, network PC, a peer device or other common network node, or the like. The communication connection 620 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 620 may also or alternatively include a transceiver device, such as a BLUETOOTH® device that enables the computer 610 to wirelessly receive data from and transmit data to other BLUETOOTH® devices. For example, the communication connection 620 in some embodiments may be a BLUETOOTH® connection with a wireless headset that includes a speaker and a microphone. As such in these embodiments, a BLUETOOTH® transceiver device may be the audio output device as described elsewhere herein.

Computer-readable instructions stored on a computer-readable medium are executable by the processing unit 602 of the computer 610. A hard drive (magnetic disk or solid state), CD-ROM, and RAM are some examples of articles including a non-transitory computer-readable medium. For example, various computer programs 625 or apps, such as virtual machine software, one or more applications and modules implementing one or more of the methods illustrated and described herein, or an app or application that executes on a server, a mobile device, within a virtual machine, or is accessible via a web browser, may be stored on a non-transitory computer-readable medium.

A further example embodiment is in the form of a data management system. The data management system of such embodiments includes a computer processor, a network interface device, a data storage device, and instructions stored on the data storage device defining modules of the data management system. The instructions of such embodiments are executable by the computer processor on data local to the data management system and as accessible via the network interface device. These modules include a policy repository module, a distributor service module, and a policy engine module.

In some embodiments, the policy repository module stores data defining at least one policy restricting replication of data by a distributor service from publisher nodes with a first association to subscriber nodes with a second association. The distributor service module, in some embodiments replicates data from publisher nodes to respective subscriber nodes upon occurrence of data events configured to invoke data replication from publisher nodes to subscriber nodes subject to compliance with policies defined in data stored in the policy repository module. Additionally, the policy engine generally executes to apply the policies defined in data stored in the policy repository module to restrict distribution of data by the distributor service module. For example, the policy engine may execute to validate, in view of policies stored in the policy repository, a new or modification of an existing data replication subscription prior to storing thereof such that only valid subscriber node data replication subscriptions can be stored.

It will be readily understood to those skilled in the art that various other changes in the details, material, and arrangements of the parts and method stages which have been described and illustrated to explain the nature of the inventive subject matter may be made without departing from the principles and scope of the inventive subject matter as expressed in the subjoined claims.

What is claimed is:

1. A method comprising:
receiving a new data distribution restriction that, when implemented, creates a data distribution restriction or modifies a current data distribution restriction, the new data distribution restriction, when implemented, restrict, distribution of particular data by publisher data storage nodes to subscriber data storage nodes not having at least one associated property;
responsive to receiving the new data distribution restriction, querying, by a policy inspector, a subscription repository for subscriptions to the particular data, by subscriber data storage nodes not having the at least one associated property, resulting in identified existing subscriptions;
suspending, by the policy inspector, the identified existing subscriptions;
storing, by the policy inspector, the received new data distribution restriction in a policy repository, wherein subsequent changes to the existing subscriptions and creation of new subscriptions to the particular data provided by the publisher data storage nodes are conditionally limited by the new data distribution restriction; and
storing, by the policy inspector, data on the subscription repository, the data defining a new subscription of a subscriber data storage node of the subscriber data storage nodes to a publisher data storage node of the publisher data storage nodes that is verified to be compliant with the new data distribution restriction.

2. The method of claim 1, wherein the particular data is data of a type subject to one or both of privacy and security regulation.

3. The method of claim 1, wherein:
data identifying the at least one associated property is data identifying at least one geographic or political area of the publisher data storage nodes and the subscriber data storage nodes.

4. A method comprising:
storing data on a data storage device identifying a data source and designating that data source as a publisher data storage node to which other data storage nodes may subscribe, and an identity property associated with the source;
storing data on the data storage device identifying a subscriber data storage node that has subscribed to the data on the data storage device and an identity property associated with the subscriber data storage node;
receiving input requesting a subscription from the publisher data storage node by a different subscriber data storage node;
retrieving, from the data storage device, identity property data identifying the identity properties of the publisher data storage node and the different subscriber data storage nodes;

retrieving, from the data storage device, any identity property-related policies associated with the identity property of one or both of the publisher data storage node and the different subscriber data storage node and the subscriber data storage node, each identity property-related policy restricting distribution of data from the publisher data storage node to be accessed by the subscriber data storage node and the different subscriber data storage node with the identity property;

receiving and storing data in the data storage device defining a new location-related policy;

applying the new location-related policy to subscriptions stored in the data storage device to identify subscriptions that violate the new location-related policy; and suspending the subscriptions that violate the new location-related policy.

5. The method of claim 4, further comprising:
(i) validating the requested subscription in view of retrieved identity property-related policies; and
upon success of the validating, storing, in the data storage device, data enabling the requested subscription and transmitting a success indication via a network in response to the received subscription request; or
(ii) upon failure of the validating, transmitting an error indication via the network in response to the received subscription request and disregarding the subscription request.

6. The method of claim 4, further comprising receiving via L network and storing on the data storage device input identifying the data source as storing a type of data subject to at least one of a privacy and security requirement limiting access to and distribution of data stored by the data source.

7. The method of claim 4, wherein the data source includes at least one of a database instance, a database table, and a column of a database table.

8. The method of claim 4, wherein:
the identity properties identify respective location of the publisher data storage node and the subscriber data storage node;
the identity property-related policies are location-related policies and
the identity property-related policies restrict distribution of data from, to, or between locations and include at least one policy implementing at least one of a privacy regulation, a security regulation, and an export control regulation.

9. The method of claim 8, wherein the location-related policies restricting distribution of data from, to, or between locations includes at least one policy implementing a customer privacy policy of an entity for which the method is performed.

10. A data management system comprising:
a network interface device;
a data storage device that stores data associated with data replication subscriptions by subscriber data nodes to data stored on publisher data storage nodes;

a policy repository storing data defining policies restricting replication of data by a distributor service, the replication from publisher data storage nodes with a first association to subscriber data storage nodes with a second association;

the distributor service that replicates data from publisher data storage nodes to respective subscriber data storage nodes upon occurrence of data events configured to invoke data replication from publisher data storage nodes to subscriber data storage nodes, the data events subject to compliance with policies defined in data stored in the policy repository, the publisher data storage node and the subscriber data storage node coupled to the distributor service through the network interface device; and a policy engine that:
applies the policies in the policy repository to restrict distribution of data by the distributor service;
queries the data storage device for subscriptions that violate a new policy of the policies resulting in identified existing subscriptions; and
suspends the identified existing subscriptions.

11. The data management system of claim 10, wherein the policy engine validates, in view of the policies, a new or modification of an existing data replication subscription prior to storing thereof such that only valid subscriber data storage node data replication subscriptions are stored.

12. The data management system of claim 10, wherein the first and second associations associate the publisher data storage node and subscriber data storage node with respective geographic areas within which they are physically located.

13. The data management system of claim 12, wherein the geographic areas include one or both of geographic and political areas.

14. The data management system of claim 13, wherein the policy repository stores data defining at least one policy restricting data distribution based on one or both of geographic and political areas of publisher data storage nodes.

15. The data management system of claim 14, wherein at least one policy further restricts data distribution based on a geographic and political area of subscriber data storage nodes.

16. The data management system of claim 14, wherein one policy restricting distribution of data based on one or both of geographic and political area definitions is a government-imposed requirement restricting data distribution.

17. The data management system of claim 14, wherein one policy restricting distribution of data based on one or both of geographic and political area definitions is associated with a particular subset of data stored by at least one publisher data storage node.

* * * * *